US012569320B2

(12) United States Patent
Richard et al.

(10) Patent No.: US 12,569,320 B2
(45) Date of Patent: Mar. 10, 2026

(54) METHOD FOR MANUFACTURING AN ABUTMENT FOR RECEIVING A DENTAL PROSTHESIS

(71) Applicant: ANTHOGYR, Sallanches (FR)

(72) Inventors: Hervé Richard, Notre Dame de Bellecombe (FR); Anne-Lise Chopard-Lallier, Sallanches (FR)

(73) Assignee: Anthogyr, Sallanches (FR)

( * ) Notice: Subject to any disclaimer, the term of this patent is extended or adjusted under 35 U.S.C. 154(b) by 265 days.

(21) Appl. No.: 18/211,744

(22) Filed: Jun. 20, 2023

(65) Prior Publication Data

US 2024/0024080 A1 Jan. 25, 2024

(30) Foreign Application Priority Data

Jul. 21, 2022 (EP) ..................................... 22186347

(51) Int. Cl.
*A61C 8/00* (2006.01)
*A61C 13/00* (2006.01)
*B23K 26/352* (2014.01)

(52) U.S. Cl.
CPC ............ *A61C 8/005* (2013.01); *A61C 8/0012* (2013.01); *A61C 8/0037* (2013.01); *A61C 13/0006* (2013.01); *B23K 26/355* (2018.08); *A61C 2008/0046* (2013.01); *Y10T 29/49567* (2015.01)

(58) Field of Classification Search
CPC ...................... Y10T 29/49567; A61C 13/0006
See application file for complete search history.

(56) References Cited

U.S. PATENT DOCUMENTS

| | | | | |
|---|---|---|---|---|
| 6,419,491 | B1 * | 7/2002 | Ricci ................... | A61F 2/30771 |
| | | | | 433/173 |
| 8,846,551 | B2 * | 9/2014 | Gupta .................. | B23K 26/355 |
| | | | | 977/901 |
| 9,138,826 | B2 * | 9/2015 | Harrison .............. | B23K 26/355 |
| 9,452,032 | B2 * | 9/2016 | Hochman ........... | A61C 8/0077 |
| 10,188,487 | B2 * | 1/2019 | Spindler .............. | A61C 8/0077 |
| 11,141,244 | B2 * | 10/2021 | Kumar .................. | A61C 8/0022 |
| 2010/0330533 | A1 | 12/2010 | Cottrell | |
| 2014/0093842 | A1 | 4/2014 | Strong | |
| 2016/0206408 | A1 | 7/2016 | Spindler | |
| 2019/0029786 | A1 | 1/2019 | Vergoullis | |
| 2022/0257351 | A1 | 8/2022 | Schneck | |

FOREIGN PATENT DOCUMENTS

| | | | | | |
|---|---|---|---|---|---|
| CN | 113953691 A | * | 1/2022 | ............. | B23K 26/00 |
| WO | WO-2010139031 A2 | * | 12/2010 | ......... | A61C 13/0004 |
| WO | 2022077129 A1 | | 4/2022 | | |

OTHER PUBLICATIONS

English Machine Translation of CN 113953691 A (Year: 2022).*

* cited by examiner

*Primary Examiner* — Sarang Afzali
(74) *Attorney, Agent, or Firm* — William H. Eilberg

(57) ABSTRACT

A method for manufacturing an abutment for receiving a dental prosthesis provides a strong bond which avoids the need for sandblasting. The abutment, which is made of titanium or titanium alloy, extends along a longitudinal direction between a proximal end and a distal end. The proximal end is configured to be received in or on a dental implant. The distal end is configured to receive and support a dental prosthesis. The distal end has a receiving surface which receives the dental prosthesis by bonding. The method includes texturing at least part of the receiving surface with a laser.

14 Claims, 6 Drawing Sheets

METHOD FOR MANUFACTURING AN ABUTMENT FOR RECEIVING A DENTAL PROSTHESIS

TECHNICAL FIELD OF THE INVENTION

The present invention relates to the field of dental restoration and more particularly relates to an abutment for receiving a dental prosthesis on a dental implant.

An abutment made of titanium or of titanium alloy for receiving a dental prosthesis on a dental implant by bonding is known, extending along a longitudinal direction between a proximal end and a distal end, comprising:

a proximal section configured to be received in or on a dental implant, a distal section configured to receive and support a dental prosthesis, said distal section having a receiving surface intended to receive said dental prosthesis by bonding.

To improve the bonding retention of the dental prosthesis on the receiving surface of the abutment, said receiving surface is usually subjected to an abrasive surface treatment such as sandblasting.

A first disadvantage is that this abrasive surface treatment, in particular by sandblasting, is complex and takes a considerable time. It is in fact necessary to protect those surfaces of the abutment that are not intended for the bonding, in particular the surface intended to come into contact with the soft tissues (gums) and the ridges defining the limits of the receiving surface that are to remain intact so as to ensure perfect continuity between the shape of the abutment and the dental prosthesis (in order to avoid discontinuities that favour accumulation of tartar and bacteria).

Furthermore, the outer surface of the abutment portion intended to be surrounded by the patient's soft tissues ("transgingival" portion of the abutment) often undergoes surface preparation or specific surface treatment aimed at promoting the healing and/or adherence of the soft tissues, or aimed at limiting the formation of dental plaque.

Sandblasting the receiving of surface the abutment, which is the surface intended to receive said dental prosthesis by bonding, can damage the surface preparation or the specific surface treatment applied to the "transgingival" portion of the abutment.

A second disadvantage is that the abutment has to be carefully cleaned after its abrasive surface treatment, so as not to leave sandblasting media behind. The sandblasting media may in fact create inflammation of the patient's soft tissues and/or impede good connection of the abutment to the dental implant or to the dental prosthesis.

A third disadvantage is that an abrasive surface treatment, for example sandblasting, darkens the colour of the receiving surface of the abutment. However, the dental prosthesis, in most cases made of a ceramic material, has a translucent character. The darkened colour of the receiving surface can therefore make the abutment more visually noticeable through the dental prosthesis. This is both unattractive and annoying for the patient, since the visual perception of the abutment by others reveals to them the prosthetic nature of the patient's tooth.

A fourth disadvantage is that a receiving surface of an abutment that has undergone sandblasting must have a relatively large surface area in order to ensure a sufficient bonding retention force. This often makes it necessary to provide a relatively long and/or bulky distal section, which limits or even prevents the possibilities of using a screwing channel in the prosthesis that is inclined with respect to the axis of a transfixing screw intended to retain the abutment on the dental implant.

The document US 2016/206408 A1 describes an abutment made of titanium powder for receiving a dental prosthesis fixed by bonding to a receiving surface of said abutment. Said receiving surface is structured by means of grooves that are formed by pushing in or removing the material of the abutment.

The document US 2019/09786 A1 describes an angled abutment made of titanium for receiving a dental prosthesis fixed by bonding to a receiving surface of said abutment. Said receiving surface is structured by means of grooves forming a grid. The angled abutment is manufactured by moulding.

The document FR 3 097 117 A1 describes an abutment made of titanium or of titanium alloy for receiving a dental prosthesis fixed by bonding to a receiving surface of said abutment. Said receiving surface is provided with a "particular structure" in order to increase the bonding retention of the prosthesis on the post. However, apart from a greater roughness compared to the raw structure that is machined, the exact consistency of said "particular structure" is not explained, still less the technical means and the method permitting its provision.

The document US 2014/0093742 A1 describes an abutment made of a primary material chosen from the group consisting of titanium and its alloys, stainless steel, ceramic, biocompatible glass and combinations thereof. The neck section of the abutment receives a surface treatment with micro-patterns, which surface treatment can be applied by laser etching, acid etching, mechanical etching or micro-machining, photolithography or other surface treatment processes. The micro-patterns are aimed at increasing the adherence of the bone or gum to the neck section of the abutment.

The document US 2010/330533 A1 aims to solve the problem of crestal bone loss after installation of a dental implant in the upper or lower jaw of a patient. To do this, said document describes a dental implant whose surface is textured by laser or covered in order to promote its osteointegration. It is also proposed that the coronal end of the implant is provided with laser-etched grooves with a depth of between 5 and 15 $\mu$m and a width of between 20 and 80 $\mu$m, in order to allow human gingival fibroblast cells to descend into and form focal adhesions inside the micro-grooves. This would limit receding gums and therefore bone loss.

SUMMARY OF THE INVENTION

A problem addressed by the present invention is to propose a method for manufacturing an abutment for receiving a dental prosthesis on a dental implant, which method makes it possible to improve the hold of a dental prosthesis by bonding, but without recourse to sandblasting.

At the same time, the invention aims to provide a method for faster manufacturing of an abutment, which limits the risks of soft-tissue inflammation and avoids creating spaces and discontinuities favouring the accumulation of tartar and bacteria, and which limits the risks of damaging the outer surface of the transgingival portion of the abutment.

According to another aspect of the present invention, a method for manufacturing an abutment is proposed which makes it possible to achieve a more satisfactory aesthetic result once the dental prosthesis is assembled on the abutment.

To achieve these objects and others too, the invention proposes a method for manufacturing an abutment made of titanium or of titanium alloy for receiving a dental prosthesis on a dental implant, extending substantially along a longitudinal direction between a proximal end and a distal end, comprising:

a proximal section configured to be received in or on a dental implant and extending along a first direction of elongation, a distal section configured to receive and support a dental prosthesis and extending along a second direction of elongation, said distal section having a receiving surface intended to receive said dental prosthesis by bonding;

according to the invention, said receiving surface is at least partially textured by laser.

Texturing by laser satisfactorily increases the bonding retention force of the dental prosthesis against an extraction force applied in the longitudinal direction.

The increase in the bonding retention force makes it possible to consider reducing the receiving surface (abutment/prosthesis interface on which the bonding is performed). A reduction of this surface is advantageous for limiting the size of the distal section and the overall size of the abutment. It is even particularly advantageous to be able to reduce the height of the distal section when one wishes to have a screwing channel in the prosthesis that is inclined with respect to the axis of the transfixing screw intended to retain the abutment on a dental implant. Good results have been obtained with a receiving surface having an area of less than 30 mm$^2$.

Texturing by laser does not require masking parts of the abutment: this therefore saves precious time and avoids accidentally damaging certain zones of the abutment (in particular at the limits of the receiving surface, and the outer surface of the transgingival portion of the abutment). Powder media for sandblasting are not used, and therefore the risks of soft-tissue inflammation and of connection problems are reduced. Finally, texturing by laser does not darken the colour of the receiving surface.

Advantageously, the texturing can be carried out by hollowing out grooves in said receiving surface, preferably forming a grid. Such texturing can be easily automated and can be carried out in a very short time (in particular less than 15 seconds).

Preferably, the grid can have a substantially rectangular pattern, preferably substantially square.

Advantageously, the texturing can be carried out by hollowing out grooves that are oriented obliquely, preferably at substantially 45°, with respect to the second direction of elongation. Such an orientation of the grooves makes it possible also to significantly increase the bonding retention force of the dental prosthesis on the abutment against an extraction force applied along the second direction of elongation.

Preferably, the grid can be produced with a substantially square pattern, of which the length of the sides is between 150 μm and 350 μm, preferably between 200 μm and 300 μm. Such a grid has given very good results in terms of the retention force of the dental prosthesis on the abutment.

Advantageously, the grooves have a depth of between 5 μm and 15 μm, preferably between 7 μm and 10 μm. Such a depth has proven a good compromise between the speed of producing the texturing and the retention force of the dental prosthesis on the abutment.

Preferably, before or after the texturing of at least part of the receiving surface, the beam of a laser can scan at least part of said receiving surface so as to bring about a yellowing of said at least part of said receiving surface. Such yellowing of at least part of said receiving surface can make the abutment less visually noticeable through the dental prosthesis. The yellowing provides an aesthetically satisfactory natural appearance of the tooth.

Performed by laser, the yellowing of the abutment can be carried out at the same station where the texturing is carried out. This is particularly advantageous, in particular with respect to colouring by anodization, since there is no transfer to a separate station for performing the colouring step. Various markings (manufacturer's logo, reference, batch number, etc.) can also be made by laser on the abutment at the same work station.

Advantageously, in order to further improve the aesthetic character of the dental restoration, the beam of the laser can scan the totality of said receiving surface so as to bring about a yellowing of the whole of said receiving surface. Even when yellowing is provided in addition to the texturing, the production time remains very short: the applicant has measured a production time, including yellowing and texturing, of just 12 seconds.

Preferably, it may be provided that:

the abutment has at least one rotation indexing member comprising a face or surface configured to cooperate with the dental prosthesis in order to block said abutment in rotation with respect to the dental prosthesis about the second direction of elongation, said face or surface is devoid of texturing.

The precision and reliability of the indexing have in fact proven better when the face or surface of said indexing member is not textured by laser.

According to another aspect of the present invention, a method is proposed for manufacturing a dental restoration assembly comprising:

a dental prosthesis, preferably manufactured from a ceramic material, an abutment made of titanium or of titanium alloy, for receiving a dental prosthesis on the dental implant, in which method:

an abutment is provided which has been obtained by implementing the manufacturing method as described above, a dental prosthesis is provided which comprises an inner housing with a connection surface intended to be attached and fixed by bonding to the receiving surface of the abutment, the dental prosthesis is attached and fixed to the abutment by bonding between the connection surface of the dental prosthesis and the receiving surface of the abutment, the connection surface of the dental prosthesis has not undergone abrasive surface treatment, in particular by sandblasting.

In order to promote good bonding retention of the dental prosthesis on the abutment, the connection surface of the dental prosthesis is normally subjected an to abrasive surface treatment, in particular by sandblasting.

The applicant has observed here that, surprisingly, the improvement in the bonding retention of the dental prosthesis on the abutment is such that it is conceivable to omit treatment of the connection surface of the dental prosthesis by means of an abrasive surface treatment, in particular by sandblasting.

Omitting an abrasive surface treatment of the connection surface of the dental prosthesis proves particularly advantageous. Precious time is saved since the zones that are not to be treated do not have to be masked, and since there is no need for thorough cleaning of the sandblasting powder media. Moreover, accidental damage to certain zones of the dental prosthesis is avoided, in particular at the limits of the connection surface, and this promotes good surface continuity between the abutment and the dental prosthesis and limits the risks of discontinuities that favour the accumulation of tartar and bacteria.

According to a further aspect of the invention, an abutment made of titanium or of titanium alloy is proposed for receiving a dental prosthesis on a dental implant, extending substantially along a longitudinal direction between a proximal end and a distal end, having:

a proximal section configured to be received in or on a dental implant and extending along a first direction of elongation, a distal section configured to receive and support a dental prosthesis and extending along a second direction of elongation, said distal section having a receiving surface intended to receive said dental prosthesis by bonding;

according to the present invention, said receiving surface is at least partially textured by laser.

Advantageously, the texturing can comprise grooves hollowed out in said receiving surface, preferably forming a grid.

Advantageously, the grid can have a substantially rectangular pattern, preferably substantially square.

Advantageously, the grid can have grooves that are oriented obliquely, preferably at substantially 45°, with respect to the second direction of elongation.

Advantageously, the grid can have a substantially square pattern, of which the length of the sides is between 150 μm and 350 μm, preferably between 200 μm and 300 μm.

Advantageously, the grooves can have a depth of between 5 μm and 15 μm, preferably between 7 μm and 10 μm.

The grooves can be bordered, along their sides, by material beads having a height of between 5 μm and 15 μm, preferably of between 7 μm and 10 μm. Such grooves have permitted a significant increase in the retention force of the dental prosthesis on the abutment.

Preferably, at least part of said receiving surface has a yellow coloration.

Advantageously, the whole of said receiving surface can have a yellow coloration.

Preferably, it may be provided that:

the abutment has at least one rotation indexing member comprising a face or surface configured to cooperate with the dental prosthesis in order to block said abutment in rotation with respect to the dental prosthesis about the second direction of elongation, said face or surface is devoid of texturing by laser.

According to yet another aspect of the present invention, a dental restoration assembly is proposed having:

an abutment obtained by the method as described above or an abutment as described above, a dental prosthesis, preferably manufactured from a ceramic material and having an inner housing with a connection surface intended to be attached and fixed by bonding to the receiving surface of the abutment.

Advantageously, the connection surface of the dental prosthesis has not undergone abrasive surface treatment, in particular by sandblasting.

BRIEF DESCRIPTION OF THE DRAWINGS

Other objects, features and advantages of the present invention will become apparent from the following description of particular embodiments given with reference to the appended figures, in which.

DESCRIPTION OF THE PREFERRED EMBODIMENTS

When identical numerical references are used in a plurality of embodiments or variants of the invention or in a plurality of figures, these numerical references designate identical or similar elements in each of the embodiments or variants or in each of the figures.

Figures 1, 2:
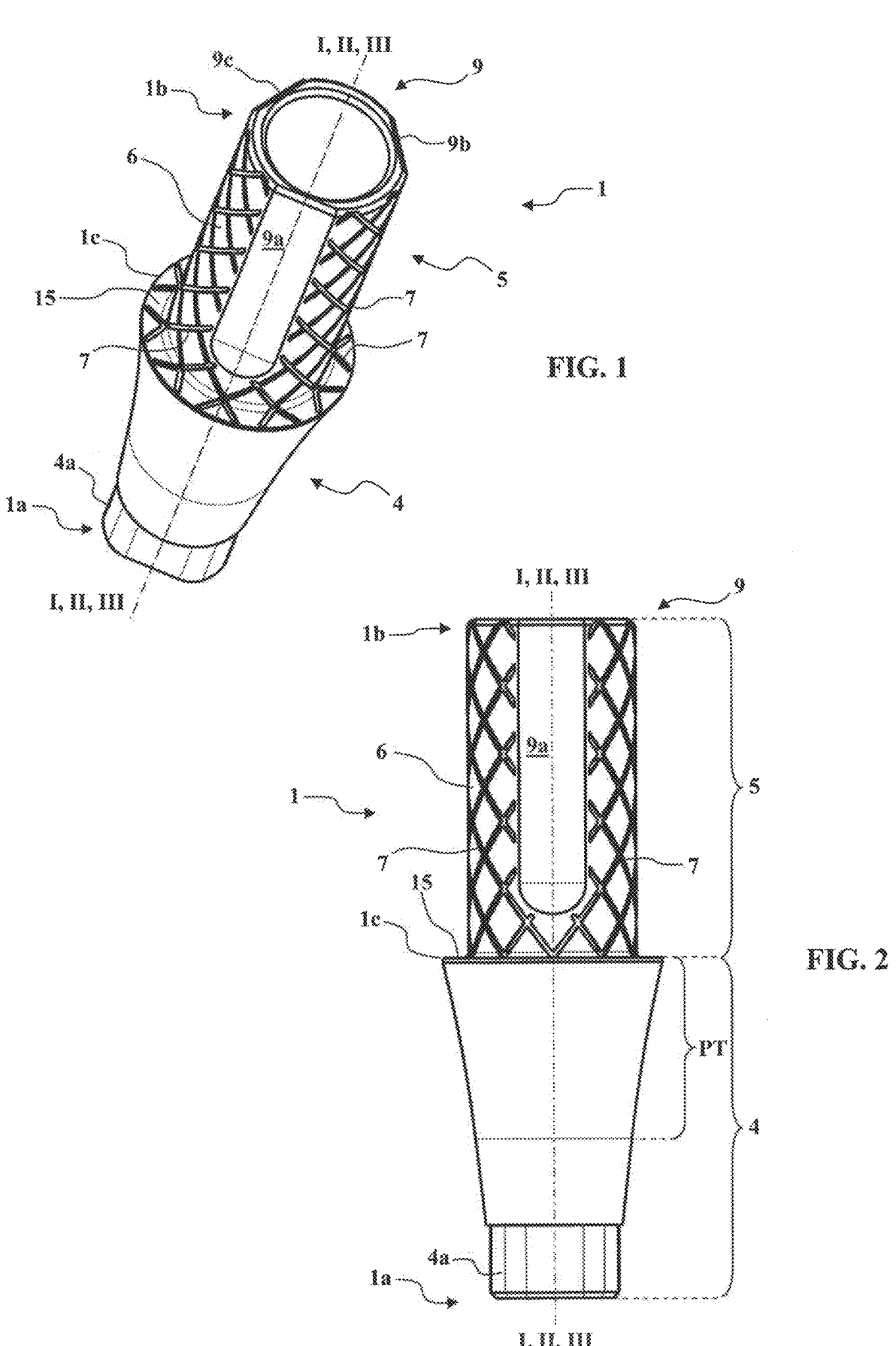
FIG. 1 is a perspective view of an abutment according to the present invention.
FIG. 2 is a side view of the abutment from FIG. 1.

FIGS. 1 and 2 illustrate an abutment 1 made of titanium alloy (more precisely of Ti6Al4V alloy) for receiving a dental prosthesis 2 (FIG. 6) on a dental implant 3 (FIGS. 7 and 8) by bonding.

The dental prosthesis is preferably manufactured from a ceramic material (zirconia or lithium disilicate, for example) and for this reason has a translucent character. Other translucent materials can also be used.

The abutment 1 extends substantially along a longitudinal direction I-I between a proximal end 1a and a distal end 1b. The abutment 1 has:

a proximal section 4 configured to be received in the dental implant 3 and extending along a first direction of elongation II-II, a distal section 5 configured to receive and support the dental prosthesis 2 (FIG. 8) and extending along a second direction of elongation III-III, said distal section 5 having a receiving surface 6 intended to receive said dental prosthesis 2 by bonding.

At least one of the first II-II and second III-III directions of elongation coincides with the longitudinal direction I-I. Here, the first II-II and second III-III directions of elongation both coincide with the longitudinal direction I-I. However, the first II-II and second III-III directions of elongation can form between them a non-zero angle, such that the abutment 1 is of the "angled abutment" type.

The receiving surface 6 is partially textured by laser.

The texturing more precisely comprises grooves 7 hollowed out in said receiving surface 6. The grooves 7 form a grid.

It will be seen more particularly from FIG. 2 that the grooves 7 are oriented obliquely, substantially at 45°, with respect to the second direction of elongation III-III.

Figure 3:
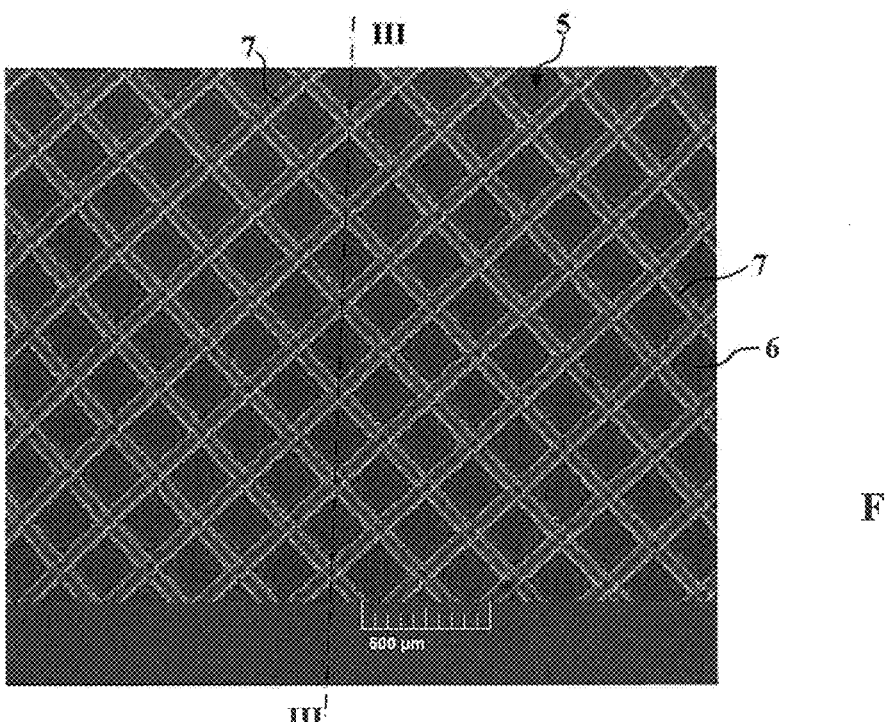
FIG. 3 is a detail view of part of the receiving surface of the abutment from FIG. 1, taken by means of a scanning electron microscope at a first magnification.
Figure 4:
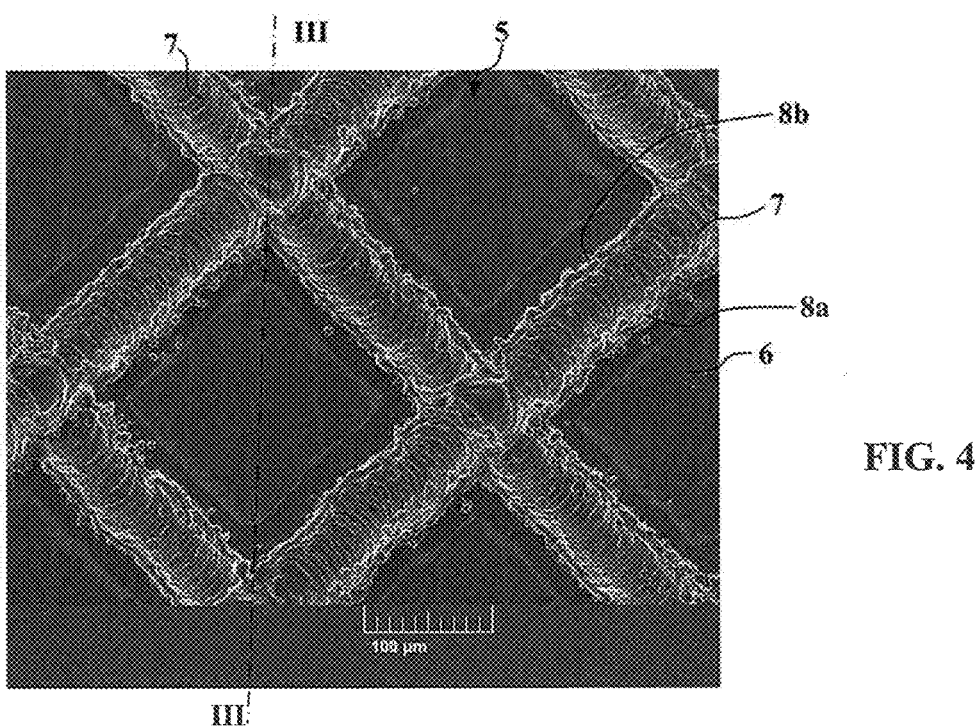
FIG. 4 is a detail view of part of the receiving surface of the abutment from FIG. 1, taken by means of a scanning electron microscope at a second magnification.

The grooves 7 are more particularly visible in FIGS. 3 and 4, which are views taken by means of a scanning electron microscope.

The grid formed by the grooves 7 has a substantially square pattern.

The length of the sides is between 150 μm and 350 μm, preferably between 200 μm and 300 μm. Here, the length of the sides is approximately 250 μm.

The grooves 7 have a depth of between 5 μm and 15 μm, preferably between 7 μm and 10 μm. Here, the grooves 7 have a depth of approximately 9.5 μm.

It will be seen more particularly from FIG. 4 that the grooves 7 are bordered, along their sides, by material beads 8a and 8b. These beads 8a and 8b result from the hollowing-out of the grooves 7 by means of the laser, and they have a height of between 5 μm and 15 μm, preferably of between 7 μm and 10 μm. Here, the beads 8a and 8b have been measured as having an average height of approximately 8 μm.

The bottom of the grooves 7 has striations substantially perpendicular to the direction of elongation of the grooves 7. These striations result from the combination of the impulses and advance of the laser source.

The texturing by means of the grooves 7 has made it possible to increase very considerably (by 87% in relation to a sandblasted abutment) the bonding retention force of the dental prosthesis 2 on the abutment 1 against an extraction force applied along the second direction of elongation III-III (coinciding with the longitudinal direction I-I).

The grooves 7 have been formed by laser using a marking/engraving machine sold commercially under the name "Combiline Advanced WT" by the Swiss company Rofin Baasel (recently bought out by the American company Coherent Inc.). This machine is provided with a laser source sold commercially under the name "PowerLine F 20 varia", which has an average maximum output power of 19 W.

To produce the texturing with grooves 7 in FIGS. 3 and 4, the following parameters have been used:

power: 50%
frequency: 50 kHz
speed: 500 mm/s
impulse duration: 100 ns
focus: 0%
pitch: 250 μm
number of passes: 2

In order to improve the aesthetic result of the dental restoration, at least part of the receiving surface 6 has been treated by laser in order to present a yellow coloration. This treatment (yellowing) can be carried out before or after the grooves 7 are hollowed out.

Figure 5:
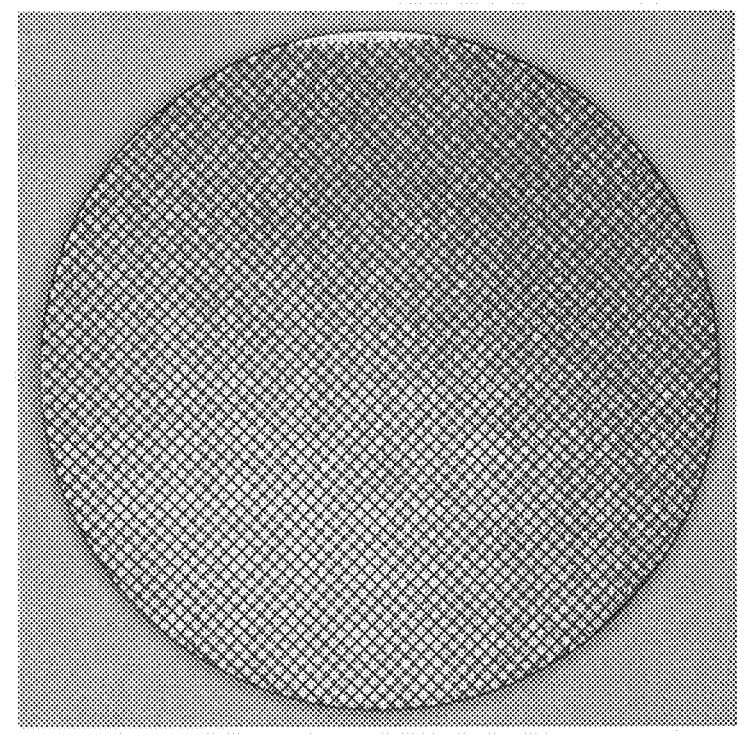
FIG. 5 shows a titanium alloy disc on which, in addition to a texturing identical to that of the receiving surface of the abutment from FIG. 1, a yellow coloration has been carried out by laser treatment.

FIG. 5 is a photograph of a disc made of titanium alloy (the same as that of the abutment 1), on which the yellowing treatment has been carried out and in which grooves 7 have been hollowed out that are identical to those of FIGS. 3 and 4. The yellowing treatment has been deliberately carried out on flat disc made of titanium alloy in order to clearly show the yellow coloration obtained, without the visual result being affected by the convex character of the receiving surface 6 of the abutment 1.

Such coloration of the receiving surface 6 is able to contribute to the dental prosthesis 2 having the appearance of a natural tooth.

Preferably, the whole of the receiving surface 6 has a yellow coloration. To do this, the totality of said receiving surface is scanned with the beam of the laser.

The yellowing treatment is carried out using the same machine that was used for producing the texturing with grooves 7, but with different operating parameters, namely:

power: between 50% and 90%
frequency: between 100 kHz and 300 kHz
speed: between 50 mm/s and 500 mm/s
impulse duration: between 14 ns and 50 ns
focus: 0%
pitch: 50 μm
number of passes: 1

More precisely, the parameters used to obtain the yellow colour in the photograph of FIG. 5 are:

power: 70%
frequency: 200 KHz
speed: 400 mm/s
impulse duration: 30 ns
focus: 0%
pitch: 50 μm
number of passes: 1

It will be seen more particularly from FIGS. 1 and 2 that the distal section 5 is present substantially in the form of a cylinder of circular cross section extending along the second direction of elongation III-III.

For positioning the dental prosthesis 2 in a predetermined orientation on the abutment 1, the abutment 1 has a rotation indexing member 9. The rotation indexing member 9 makes it possible to block the abutment 1 in rotation with respect to the dental prosthesis 2 about the second direction of elongation III-III (coinciding with the longitudinal direction I-I).

The rotation indexing member 9 here comprises three flats formed at 120 degrees to one another on the lateral surface of the distal section 5, resulting in three plane faces 9a, 9b, 9c.

Figure 6:
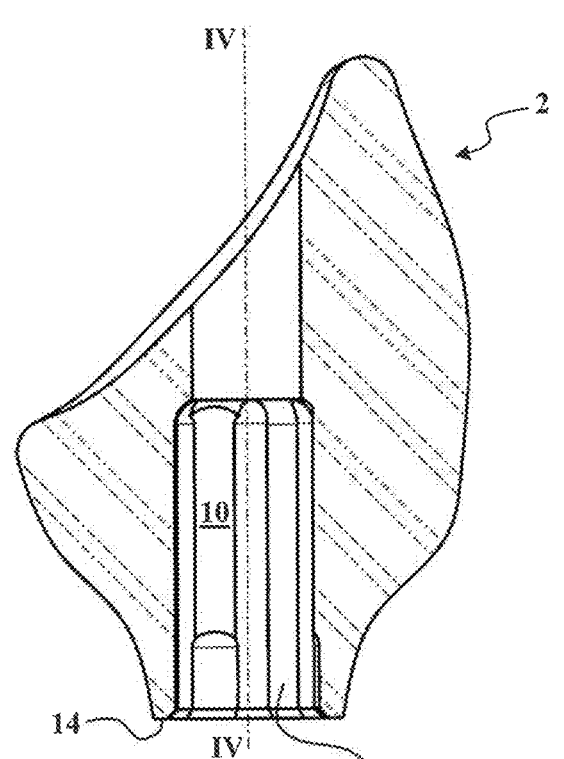
FIG. 6 is a sectional view of a dental prosthesis intended to be attached and bonded to the abutment from FIG. 1.
Figure 7:
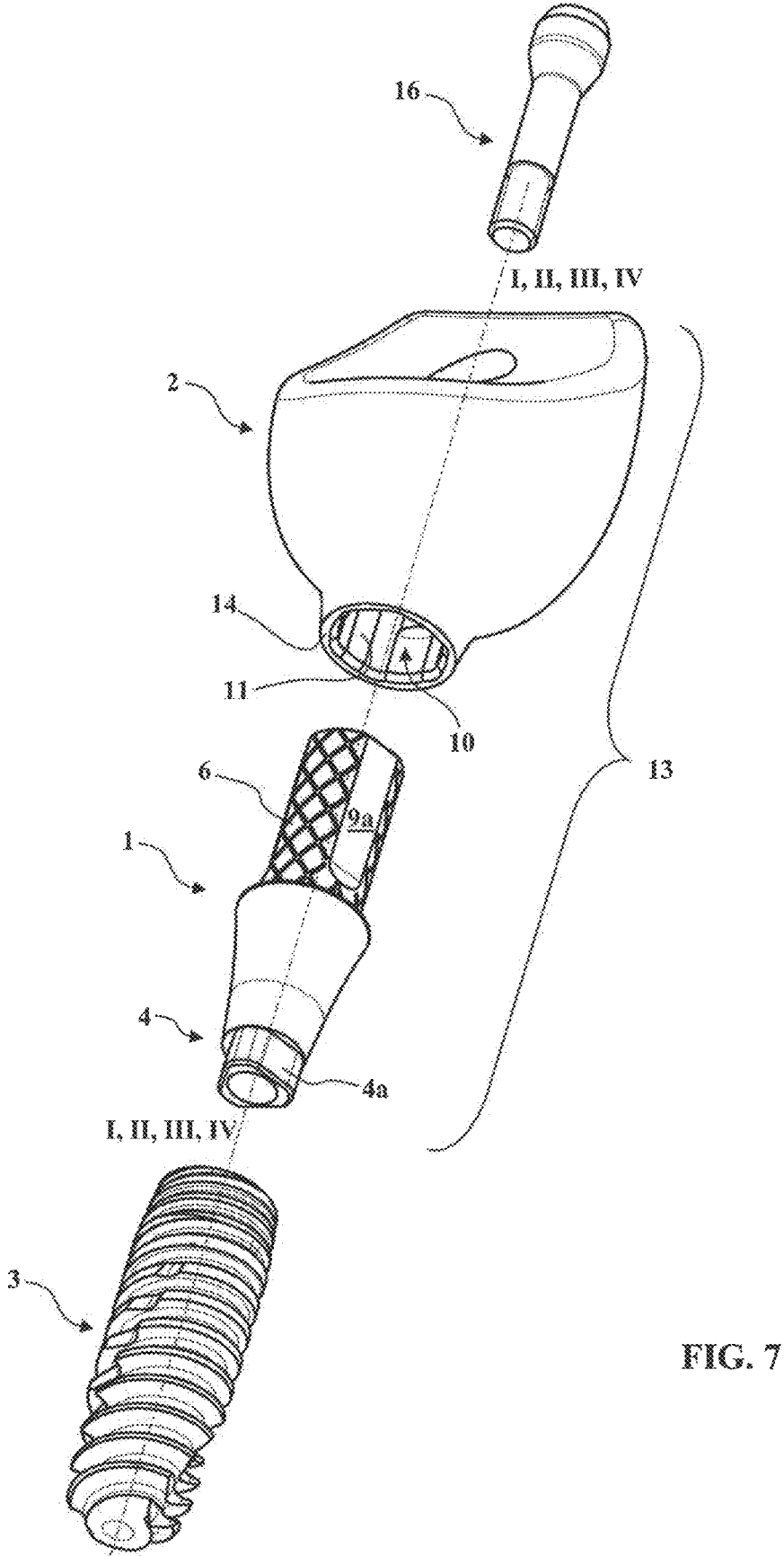
FIG. 7 is an exploded perspective view of a dental implant, of a dental restoration assembly comprising the abutment from FIG. 1 and the dental prosthesis from FIG. 6, and of a screw.
Figure 8:
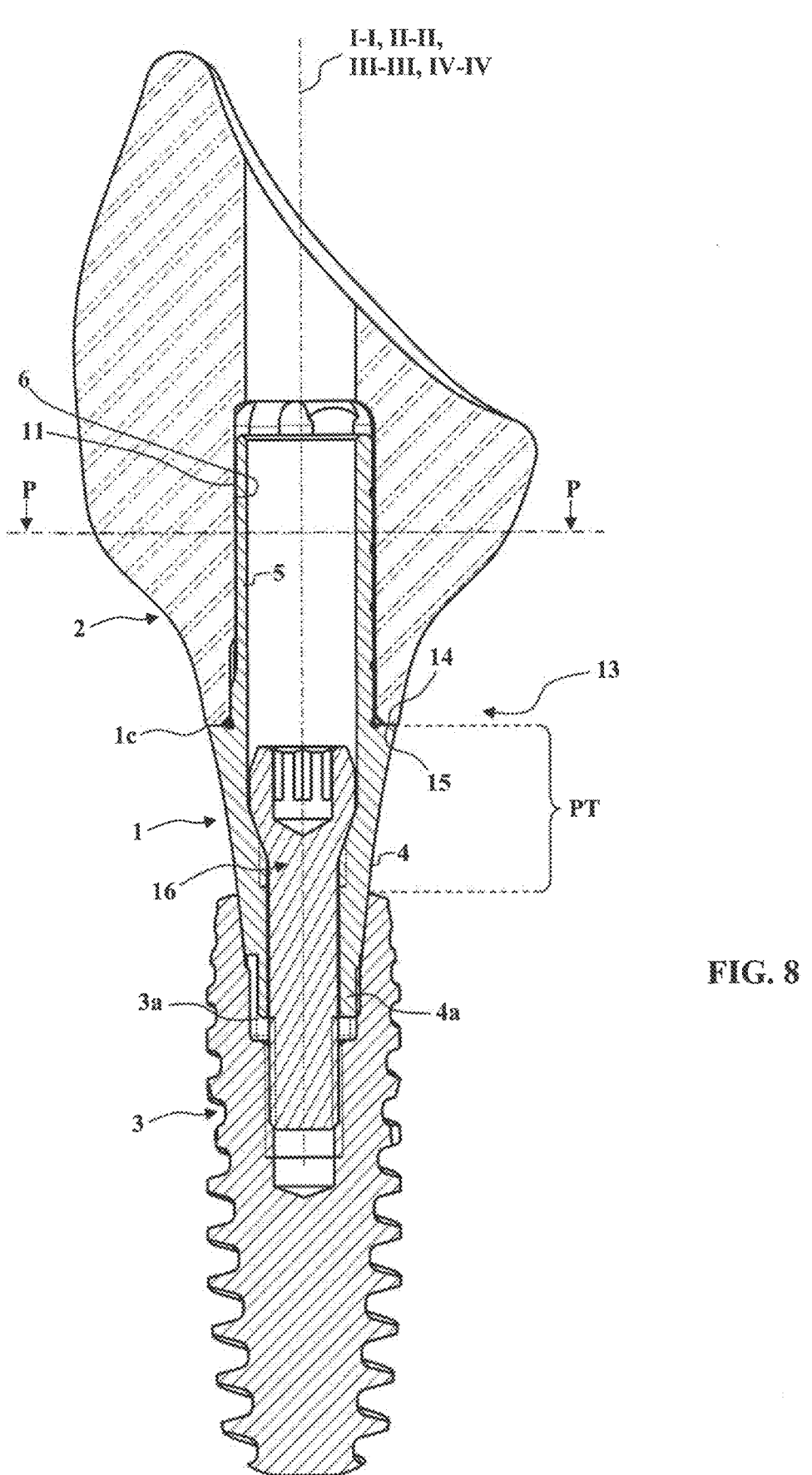
FIG. 8 is a side view, in longitudinal section, of the dental implant, of the dental restoration assembly and of the screw from FIG. 7.

For its part, the dental prosthesis 2 comprises an inner housing 10 extending along a third direction of elongation IV-IV. The inner housing 10 has a connection surface 11 intended to be attached and fixed by bonding to the receiving surface 6 of the abutment 1 (FIGS. 6 to 8).

Figure 9:
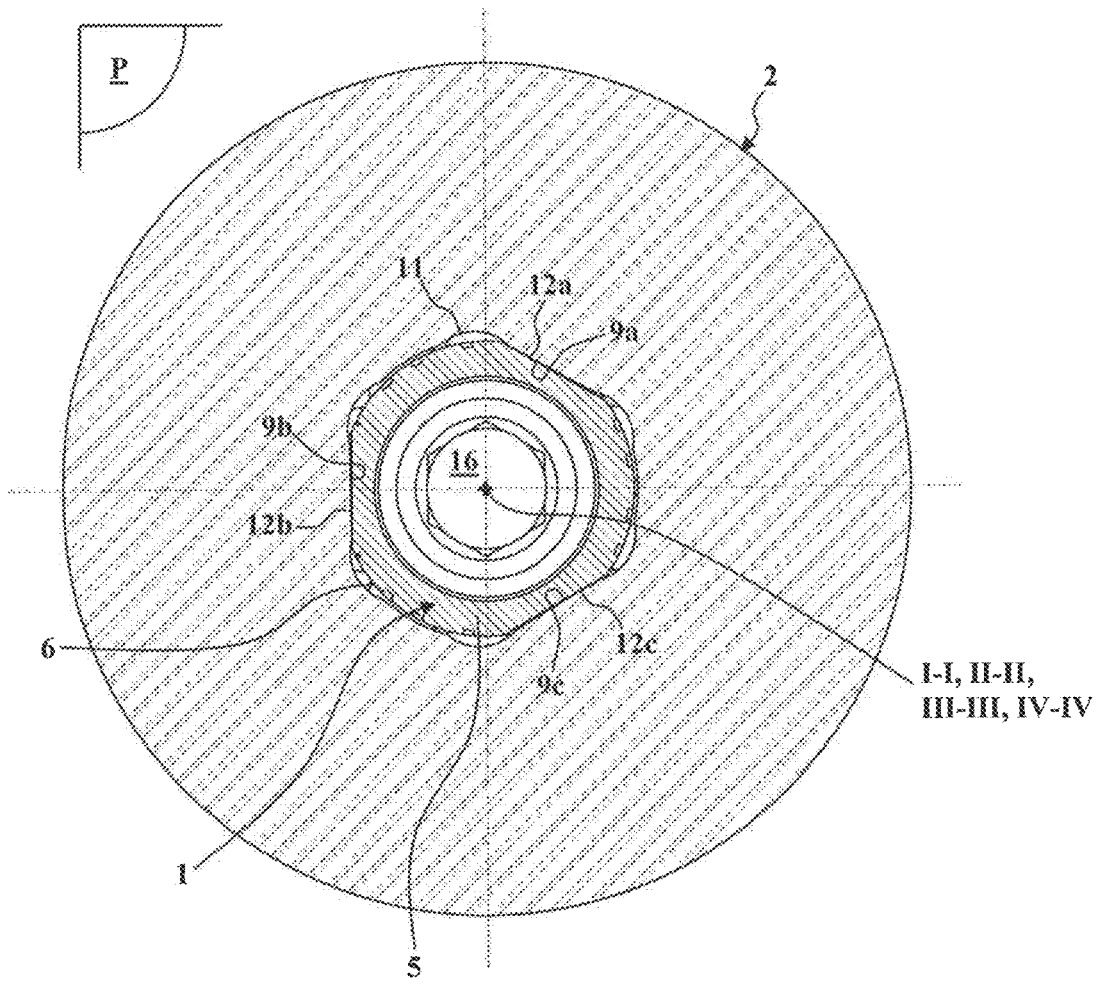
FIG. 9 is a transverse sectional view of the dental restoration assembly from FIG. 8.

It will be seen more particularly from FIG. 9 (which is a sectional view along the plane P of FIG. 8) that the connection surface 11 has three plane faces 12a, 12b and 12c which are arranged at 120 degrees to one another.

When the dental prosthesis 2 is received by engagement (and bonding) on the distal section 5 of the abutment 1, the three plane faces 9a to 9c of the distal section 5 cooperate with the three plane faces 12a to 12c of the dental prosthesis 2 in order to block the abutment 1 in rotation with respect to the dental prosthesis 2 about the second direction of elongation III-III (coinciding with the longitudinal direction I-I).

To guarantee satisfactory functioning of the indexing performed between the abutment 1 and the dental prosthesis 2, the faces 9a to 9c of the indexing member 9 are devoid of texturing by laser. This therefore avoids the formation of material beads similar to the beads 8a and 8b, which material beads could adversely affect the correct engagement of the dental prosthesis 2 on the abutment 1 and their correct indexing.

It will be seen more particularly from FIG. 7 that the proximal section 4 of the abutment 1 ends with an indexing section 4a which has a non-circular cross section (substantially triangular here). The indexing section 4a is intended to be received in an indexing housing 3a (FIG. 8) of non-circular and complementary cross section. The indexing section 4a and the indexing housing 3a cooperate in order to block the abutment 1 in rotation with respect to the dental implant 3 about the longitudinal direction I-I.

After it has been textured (and optionally coloured) by laser, the abutment 1 can be used to manufacture a dental restoration assembly 13 (FIGS. 7 and 8) with the aid of the dental prosthesis 1.

To do this, the dental prosthesis 2 is attached (by bringing the second direction of elongation III-III and the third direction of elongation IV-IV into coincidence) and fixed to the abutment 1 by bonding between the connection surface 11 of the dental prosthesis 2 and the receiving surface 6 of the abutment 1.

The fact that the receiving surface 6 has been textured by laser makes it possible in particular to avoid damaging the circular ridge 1c (FIGS. 1 and 2) which delimits the receiving surface 6 of the abutment 1. Thus, the proximal section 4 of the abutment 1 forms a continuous prolongation of the dental prosthesis 2, avoiding the presence of discontinuities that favour the accumulation of tartar and bacteria.

Normally, in order to promote good bonding retention of the dental prosthesis 2 on the abutment 1, the connection surface 11 of the dental prosthesis 2 is subjected to an abrasive surface treatment, in particular by sandblasting.

However, abrasive treatment of this kind can lead to degradation of the surface 14 (substantially in the shape of a crown) intended to come into contact with a corresponding surface 15 (also substantially in the shape of a crown and forming part of the receiving surface 6) provided on the abutment 1 and delimited by the circular ridge 1c, and/or to degradation of the outer surface of the transgingival portion PT of the abutment 1 (FIG. 8).

To limit the risks of discontinuities between the abutment 1 and the dental prosthesis 2 still further, which discontinuities favour the accumulation of and tartar bacteria, it is possible to dispense with applying an abrasive surface treatment, in particular by sandblasting, to the connection surface 11 of the dental prosthesis 2.

The applicant has in fact observed here that, surprisingly, the improvement in the bonding retention of the dental prosthesis 2 on the abutment 1 by laser texturing is such that it is conceivable to omit treatment of the connection surface 11 of the dental prosthesis 2 by means of an abrasive surface treatment, in particular by sandblasting.

It will be seen more particularly from FIGS. 7 and 8 that a screw 16 enables the dental restoration assembly 13 to be retained on the dental implant 3.

The present invention is not limited to the embodiments that have been explicitly described, and instead it includes the various variants and generalizations contained within the scope of the following claims.

The invention claimed is:

1. A method for manufacturing a dental abutment, said method comprising the following steps:

providing a dental abutment made of titanium or of titanium alloy for receiving a dental prosthesis on a dental implant, said dental abutment extending along a longitudinal direction (I-I) between a proximal end and a distal end, said dental abutment comprising:

a) a proximal section configured to be received in or on a dental implant and extending along a first direction of elongation (II-II), b) a distal section configured to receive and support a dental prosthesis and extending along a second direction of elongation (III-III), said distal section having a receiving surface intended to receive said dental prosthesis by bonding, texturing at least partially the receiving surface by hollowing out grooves into said receiving surface using a laser.

2. A method for manufacturing a dental abutment according to claim 1, wherein the texturing forms a grid.

3. The method for manufacturing a dental abutment according to claim 2, wherein the grid has a rectangular pattern or a square pattern.

4. The method for manufacturing a dental abutment according to claim 3, wherein the texturing is carried out by hollowing out grooves that are oriented obliquely with respect to the second direction of elongation (III-III).

5. The method for manufacturing a dental abutment according to claim 4, wherein the grooves are oriented at 45° with respect to the second direction of elongation (III-III).

6. A method for manufacturing a dental abutment according to claim 3, wherein the grid is produced with a square pattern, with squares having a side length between 150 μm and 350 μm.

7. The method for manufacturing a dental abutment according to claim 6, wherein the side length is between 200 μm and 300 μm.

8. A method for manufacturing a dental abutment according to claim 2, wherein the grooves have a depth of between 5 μm and 15 μm.

9. A method for manufacturing a dental abutment according to claim 8, wherein the grooves have a depth of between 7 μm and 10 μm.

10. The method for manufacturing a dental abutment according to claim 1, wherein, before or after the texturing at least partially the receiving surface, a beam of the laser scans at least part of said receiving surface so as to bring about a yellowing of at least one part of said receiving surface.

11. The method for manufacturing a dental abutment according to claim 10, wherein the beam of the laser scans said receiving surface in an entirety of said receiving surface so as to bring about a yellowing of the entirety of said receiving surface.

12. A method for manufacturing a dental abutment according to claim 1, wherein:

a) the dental abutment has at least one rotation indexing member comprising a face or surface configured to cooperate with the dental prosthesis in order to block said dental abutment in rotation with respect to the dental prosthesis about the second direction of elongation (I-III), and b) said face or surface is devoid of texturing.

13. The method for manufacturing a dental abutment according to claim 1, wherein the grooves are bordered, along sides of the grooves, by material beads having a height of between 5 μm and 15 μm.

14. A method for manufacturing a dental abutment according to claim 13, wherein the material beads have a height of between 7 μm and 10 μm.

\*  \*  \*  \*  \*